(12) United States Patent
Sperandei et al.

(10) Patent No.: US 9,281,721 B2
(45) Date of Patent: Mar. 8, 2016

(54) PERMANENT-MAGNET ELECTRIC MOTOR COMPRISING A SEGMENTED STATOR

(75) Inventors: Jean Sperandei, Toulouse (FR); Gilles Pupille, Verdier (FR)

(73) Assignee: AIRBUS DEFENCE AND SPACE SAS, Les Mureaux (FR)

( * ) Notice: Subject to any disclaimer, the term of this patent is extended or adjusted under 35 U.S.C. 154(b) by 375 days.

(21) Appl. No.: 13/635,719

(22) PCT Filed: Mar. 17, 2011

(86) PCT No.: PCT/EP2011/054024
§ 371 (c)(1),
(2), (4) Date: Oct. 25, 2012

(87) PCT Pub. No.: WO2011/113887
PCT Pub. Date: Sep. 22, 2011

(65) Prior Publication Data
US 2013/0088115 A1    Apr. 11, 2013

(30) Foreign Application Priority Data

Mar. 19, 2010   (FR) ...................... 10 52002

(51) Int. Cl.
| | |
|---|---|
| H02K 1/18 | (2006.01) |
| H02K 1/14 | (2006.01) |
| H02K 1/27 | (2006.01) |
| H02K 3/47 | (2006.01) |
| H02K 16/02 | (2006.01) |
| H02K 21/14 | (2006.01) |
| H02K 21/22 | (2006.01) |

(52) U.S. Cl.
CPC .................. *H02K 1/18* (2013.01); *H02K 1/148* (2013.01); *H02K 1/2706* (2013.01); *H02K 1/2786* (2013.01); *H02K 3/47* (2013.01); *H02K 16/02* (2013.01); *H02K 21/14* (2013.01); *H02K 21/225* (2013.01)

(58) Field of Classification Search
None
See application file for complete search history.

(56) References Cited

U.S. PATENT DOCUMENTS

| | | | |
|---|---|---|---|
| 7,250,702 B2 | 7/2007 | Akar et al. | |
| 2004/0187963 A1 | 9/2004 | Tayu et al. | |
| 2006/0028093 A1* | 2/2006 | Minagawa | ............. H02K 1/182 310/268 |

(Continued)

FOREIGN PATENT DOCUMENTS

DE    37 15 123    11/1988

(Continued)

OTHER PUBLICATIONS

International Search Report dated Dec. 7, 2011, corresponding to PCT/EP2011/054024.

*Primary Examiner* — Tran Nguyen
(74) *Attorney, Agent, or Firm* — Young & Thompson (57) ABSTRACT

An electric motor (1) with permanent magnets includes a rotor (4), on which permanent magnets are fastened (6), and a stator (2). The stator includes a stator structure and coils (5) installed on the stator structure. The stator structure is realized by an assembly of at least three independent stator elements (21), assembled on a baseplate (3) with no direct mechanical linkage between them. Each stator element (21) is fastened onto the baseplate (3) of the motor by an adjusted fastener (31) and at least one anti-rotation element (32). Preferably, the stator elements (21) are made of a material that is a good heat conductor and electrical insulator, such as a ceramic.

17 Claims, 4 Drawing Sheets

(56) References Cited

U.S. PATENT DOCUMENTS

2006/0103263 A1* 5/2006 Naito .................... H02K 1/148
                                                           310/268
2007/0138904 A1* 6/2007 Chae ..................... H02K 1/148
                                                           310/268
2010/0327688 A1   12/2010 Canini et al.

FOREIGN PATENT DOCUMENTS

| FR | 2 852 162   | 9/2004 |
| FR | 2 926 935   | 7/2009 |
| JP | 2002 027781 | 1/2002 |
| WO | 2005/089327 | 9/2005 |

* cited by examiner

Fig. 2a
Section B-B

Fig. 2b
Section A-A

PERMANENT-MAGNET ELECTRIC MOTOR COMPRISING A SEGMENTED STATOR

BACKGROUND OF THE INVENTION

1. Field of the Invention

The present invention relates to the field of electric motors.

More specifically, the invention concerns an precision high efficiency electric motor with permanent magnets that is able to deliver high torque in extreme operating conditions that do not allow sufficient cooling of the motor's elements by convection to be realized.

2. Description of the Related Art

The technology and operating principles of permanent magnet motors are well known; the main advantage of these motors is that they do not use rotating electrical contacts when only the stator is carrying magnetic induction coils; this has led this type of brush-less motor to be widely used, particularly where the required switching of currents in the coil can be realized using static switches controlled by an ECU.

Figure 1:
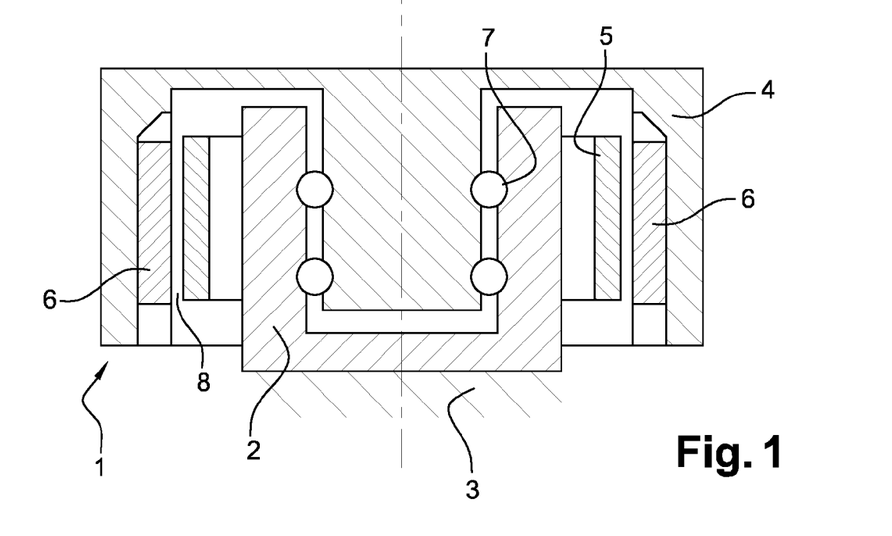
FIG. 1: already mentioned, a cross-section of a permanent magnet motor according to the prior state of the art.

As shown in FIG. 1, which shows a cross-section of a known permanent magnet motor, the motor 1 comprises a stator 2, fastened to a carrier structure 3 on which are fastened the coils 5 that generate a rotating magnetic field and a rotor 4 on which the permanent magnets 6 are fixed, driven by the stator's rotating magnetic field.

To induce a rotating magnetic field of the stator 2, the current in each coil is itself switched, depending on the position of the rotor 4, to create the torque of the motor 1 by known means, not shown.

This type of motor, which is often used, nevertheless has production constraints where high performance in terms of torque, rotational speed, yield, precision, etc. are required, all the more so when the motor's operating conditions are harsh.

A first limitation of these motors is to realize spaces as small as possible between the rotating parts and the fixed parts to reduce the gaps 8, which can be of less than a millimeter, and to maximize the usable magnetic fields, while preventing any mechanical contact between the rotor 4 and the stator 2.

A second constraint is to limit the energy losses in the motor linked to its operation.

Energy losses by friction are limited by using rollers or bearings 7 suited to the motor's loading.

Energy losses by Joule effect in the conductors of the coils are limited by using a material that is a good electrical conductor, most often copper or aluminum, even though it is not as good an electrical conductor, where the mass of the motor must be reduced.

In addition, since the magnetic field of a coil and the field created by the rotor's permanent magnets, rotating in relation to the stator, are variable, depending on the time at a given point of the stator, these magnetic fields generate induced currents—the Foucault currents—in the conducting elements they go through and, because of the electrical resistance of these conducting materials, they absorb energy which is recovered as heat, via the Joule effect.

The effect of these various sources of energy losses is to increase the temperature of the motor when in operation, which increase in temperature, in addition to the effects of differential thermal expansion of the materials used in the motor's structure that modify the value of the gap 8 and are likely to cause deformations of the motor's structure, also modify the magnetic performance of the permanent magnets, with their magnetization decreasing as the temperature increases.

The effects of this loss of magnetization of the magnets are all the more severe that the magnets with the highest performance are those most sensitive to this temperature effect, which have a relatively low maximum operating temperature, much lower than the Curie temperature, e.g. maximum operating temperatures of the order of 380 Kelvin for neodymium magnets.

To counteract these effects of increasing temperature, it is known to look for improved cooling of the motor in operation.

In ordinary operating conditions, choosing metal cores, which are good heat conductors, for the coils—a mechanically resilient and economical solution—together with forced ventilation of the motor ensure a sufficiently high removal of the heat energy dissipated by the coils and in the metal cores to limit the operating temperature.

To prevent both energy losses by Foucault currents and the corresponding heating up, using an electrically non-conductive material to realize the coil cores is known, in particular a resin-based synthetic material. However, the mechanical performance of such resins are limited and their thermal expansion coefficients are different from those of the motor's metal portions, leading to deformations of the cores when the temperature of the motor increases, which are not acceptable in high-performance motors.

A solution, presented in U.S. Pat. No. 3,974,406 consists of using an electrically insulating and non-magnetic ceramic to realize the core of the stator's coils.

Such non-magnetic and electrically non-conducting ceramics, with a resistivity higher than $10^5$ Ohms·m, prevent, like resin-based synthetic materials, losses by Foucault currents, improving the motor's efficiency and limiting its heating.

However, ceramics have a low thermal coefficient of expansion, very different from that of the metallic materials utilized in the other portions of the motor; they are also not ductile and cannot deform as in the case of using synthetic resins, which limits their use to small-size motors, with the risk otherwise of deteriorating the structure of the motor under the effect of the differential expansions.

Because of the limitations and constraints imposed by known solutions, realizing motors able to deliver high torque using high efficiency electric motors using permanent magnets is particularly difficult when the operating conditions preclude the addition of active cooling means, e.g. by forced convection, or when such cooling means are not desirable.

Such conditions are found, in particular, in vacuum, where cooling cannot be achieved by a flow of air and in motors sealed against aggressive conditions: earth, dust, mud, etc.

SUMMARY OF THE INVENTION

To overcome these difficulties, the invention proposes an electric motor with permanent magnets comprising a rotor on which permanent magnets are fastened and comprising a stator that itself comprises a stator structure and coils arranged onto this stator structure. The stator structure is split into a set of several stator elements, at least three elements, made of electrically non-conductive or low-conductivity material, juxtaposed and fastened only to a baseplate. Thus, splitting the stator into three or more separate elements means the stator can be fastened to the baseplate with a sufficient number of fasteners distributed over the various elements to ensure the mechanical strength of the stator while still allowing relative movement between these elements; this allows a stator of large dimensions to be realized, in particular as to the length of the stator, i.e. following its perimeter for a crown-shaped stator; it also allows a motor with a three phase supply to be realized, reducing the fluctuations in the motor's torque.

In practice, each stator element is realized with a length according to the stator perimeter shorter than a length beyond which the differential thermal expansions between the stator element and the baseplate to which it is fastened, taking into account the material the stator is made of and the material the baseplate is made of and under the effect of the various internal temperatures allowed for the motor in operation, as well as the levels of vibrations and shocks, would lead to unacceptable deformations of the stator or baseplate or to unacceptable mechanical stresses in the motor's various portions, i.e. incompatible with the motor's operation, its performance and it operational lifespan.

Choosing the dimensions of the stator elements to prevent the occurrence of deformations and stresses in the structure of the motor ensures an improvement in its operational lifespan and performance because of the absence of appreciable deformation, in spite of the unavoidable heating of the motor and of the vibration and shock levels to which it is subjected in operation.

Advantageously, the stator elements are fastened onto the baseplate, e.g. a metal baseplate, with some clearance between neighboring stator elements, which is chosen so as to remain positive or zero irrespective of the accepted internal temperature of the motor, to prevent mechanical stresses from being introduced by one stator element to a neighboring element during differential thermal expansion between the baseplate and the stator elements.

To prevent the introduction of forces between a stator element and the baseplate on which it is fastened and thus, so that each stator element remains without appreciable stresses due to differential thermal expansion between the stator element and the baseplate, each stator element is fastened onto the baseplate by a single fastening element, e.g. a screw, thus allowing the differential expansion of said element in relation to the baseplate without the stator element being stressed, as would be the case if it were fastened by two or more fasteners.

Advantageously, at least one anti-rotation element, e.g. a pin that prevents rotation of the stator element around the single fastener is used to stop the rotation of said element when it is being assembled onto the baseplate. This anti-rotation element can possibly be removed after assembly; when it remains in place in the motor after the stator has been assembled, it is arranged with the stator element such that it introduces no stress in the stator element due to the differential thermal expansion between the stator and the baseplate on which this stator element is fastened.

To carry the stator coils, each stator element comprises at least a winding area on the side of a free extremity of said stator element and a fastening foot on the side of an extremity of the stator element opposite the free extremity, with which the stator is fastened to the baseplate.

The fastener foot has an bearing surface enlarged in relation to a cross-section of the winding area that is in contact with the baseplate to provide improved mechanical strength and a contact surface with the baseplate that encourages heat exchanges and removal of the heat produced by Joule effect in the windings of the stator and, where applicable, by the Foucault currents circulating within the stator elements.

To maintain the wires of the stator windings, the winding area comprises a recess around a core on which the wires of the winding rest.

Preferably, to provide increased volume in the vicinity of the bun of the winding coils and support and protect the wires in the vicinity of these coils, the recess is wider on the upper edge, in the side of the free extremity of the stator element and on the lower edge, on the side of the fastener foot, than on the lateral edges of the winding area.

To ensure the energy radiated in the form of heat by the stator winding is not radiated, at least in part, towards the rotor magnets, at least one web of the stator element borders the recess of each winding area, at least on certain sides of the recess so as to form an anti-radiative heat screen between the windings and a crown of magnets of the rotor.

In a particular form of realization, advantageous when the rotor magnets are located on either side of the stator, the recess is made in the form of a groove, at least on one edge of the winding area, bordered by webs on each side of the groove on either side of the coils.

To realize the coils and put the coil wires into place, advantageously on at least one of the stator's inner—on the side of the motor's axle 9—or outer—on the side opposite the motor's axle—sides, the width of a space between two adjacent stator elements is at least equal to a diameter of the coil wires arranged on the stator structure, in practice, just sufficient to insert the wires.

Preferably, to limit the generation of Foucault currents and to remove the heat produced by Joule effect in the coil wires by heat conduction towards the baseplate and the surrounding structure, the material of which the stator elements are made is a good heat conductor material and also electrically non-conductive or has low conductivity, typically having an electrical resistivity greater than or equal to 1005 Ohms·m.

In a preferred embodiment of the motor, the material of the stator elements is a ceramic material and, preferably, a ceramic material selected from ceramic materials with heat conduction greater than or equal to 80 W/m·K, such as an aluminum and boron nitride.

Advantageously, the ceramic material of the stator elements is an aluminum nitride with thermal conduction greater than 150 W/m·K.

In an embodiment of the motor of the invention, the stator is split into stator elements that each comprises a single winding area.

Thus, the stator comprises a possibly high number of stator elements that corresponds, in this case, to the number of steps of the motor, which would be implemented as a stepping motor, without leading to stator elements with dimensions too small to allow the stator to be assembled with particular difficulties.

Advantageously, the stator elements have a similar geometric shape and, if there is no constraint of the motor to justify that the stator elements be different one from the other, the stator elements are geometrically identical to facilitate the manufacturing process and assembly of these stator elements.

Advantageously, the permanent magnets of the rotor are neodymium magnets; the invention makes their possible by preventing the excessive heating of these magnets linked to the operation of the motor.

In a form of realization to achieve high torque in the motor, the rotor is equipped with two rows of permanent magnets, between which rows the stator is maintained.

In a simplified form of realization, when lower torque is desired, the rotor is equipped with a row of permanent magnets and a soft iron web, between which row and web the stator is maintained.

Advantageously, to limit the heating of the magnets by the heat radiation of the windings that is not stopped by other means, the sides of the permanent magnets turned towards the windings are covered with a coating that reflects heat radiation.

A motor utilizing the principles of the invention makes operation possible without active cooling or in a vacuum with an inner temperature below 380K in the vicinity of the permanent magnets.

BRIEF DESCRIPTION OF THE DRAWING FIGURES

The description of the invention is made is made with reference to the figures, which illustrate schematically and in a non-limiting way:

FIG. 2b: a cross-section along a plane AA perpendicular to the axis of rotation of the motor in FIG. 2a;

FIG. 6b: a side view of an element of the stator of the motor in FIG. 6a.

DETAILED DESCRIPTION OF THE INVENTION

The invention is described in detail in the case of a rotary electric motor with permanent magnets comprising two rows of magnets fastened to the rotor.

Figure 2A:
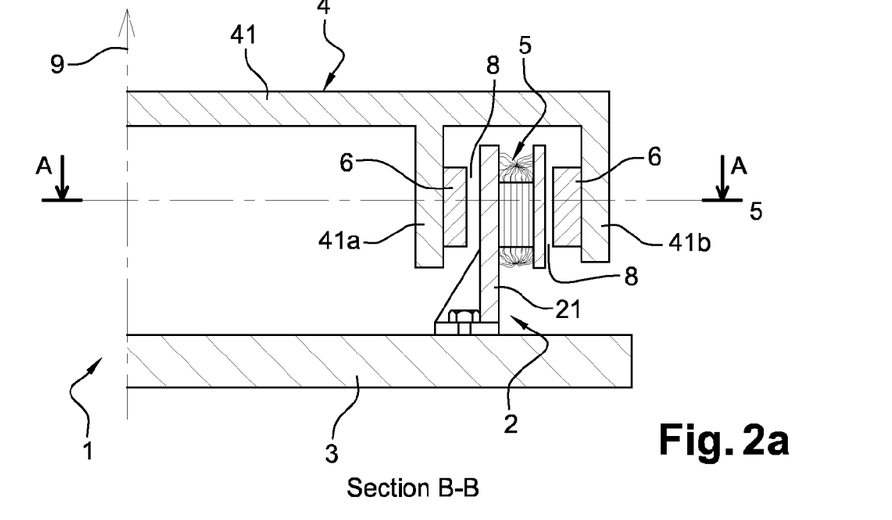
FIG. 2a: a partial cross-section along an axial plane BB of a motor according to the invention.
Figure 2B:
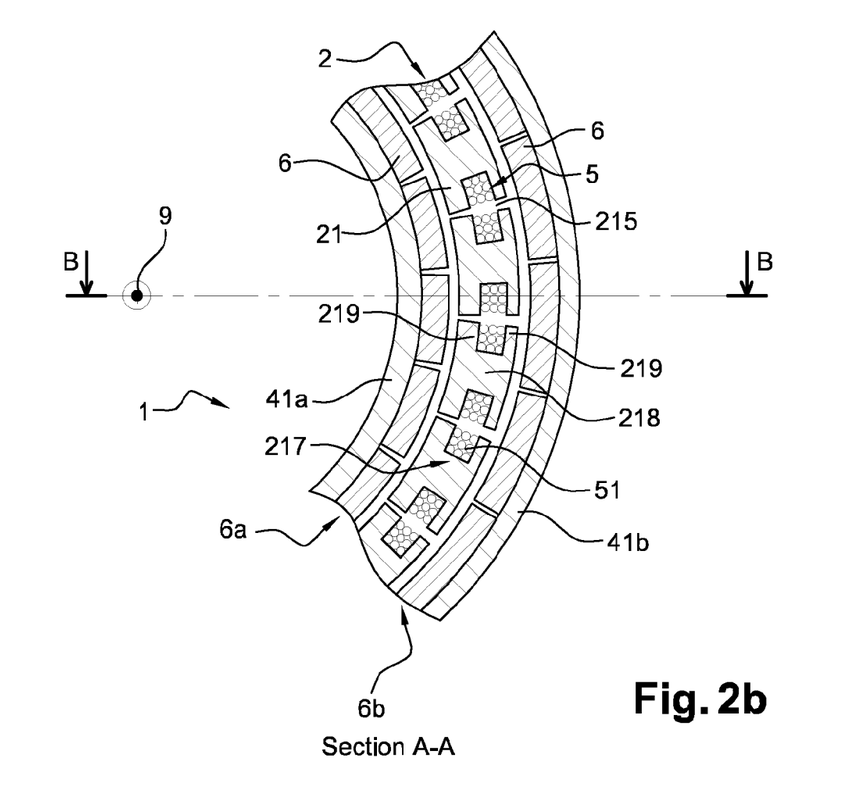

Such a motor, as illustrated in the cross-sections of FIGS. 2a and 2b, comprises:
- a stator 2 bearing coils 5 that has, geometrically, a rotational symmetry about and axis 9, which coincides with an axis of rotation of the motor;
- a rotor 4 bearing permanent magnets 6, with an axis of rotational symmetry coincident with the axis 9 of rotational symmetry and of rotation of the motor.

The stator 2 is fastened on a baseplate 3 that provides the accurate positioning of said stator and transmits the forces applied to the stator during the operation of the motor.

The stator 2 forms a regular revolution crown.

The baseplate 3 makes it possible to fasten the motor 1 with a support structure, not shown.

The rotor 4 is mounted to be mobile in rotation about the axis 9, e.g. by means of a shaft, not shown, fastened to the baseplate 3 and of rollers or bearings, not shown, such that said rotor is kept centered in relation to the stator 2 while remaining free in rotation, with minimum mechanical friction.

In the example of realization described, two rows of permanent magnets are fastened on the rotor 4, making up a first rotating crown 6a, called "inner magnet crown" and a second rotating crown 6b, called "outer magnet crown", on which the magnets are arranged at a distance from the axis of rotation 9 greater than at which the inner crown magnets 6a are fastened.

The two crowns of magnets: inner 6a and outer 6b are arranged such that a space with a substantially constant width is formed between the two crowns, in which space, the stator 2 is found.

In the rotor 4, the magnets 6 of the two crowns are held by a rotor structure whose rigidity and mechanical strength are adapted to the rotor's achievable speed of rotation and to the forces to be transmitted, in particular torque and centrifugal acceleration.

In particular, the strength and rigidity of the rotor structure 4 are such that no deformation while the motor is in operation leads to a mechanical contact between the magnets 6 of the inner 6a and outer 6b crowns and of any portion of the rotor in general, and the stator 2 and maintains an allowable "gap" 8 value between the stator 2 and the rotor 4. The magnets are, for example, fastened to protruding metal load-bearing portions 41a, 41b of a main structure 41 of the rotor.

Figure 3:
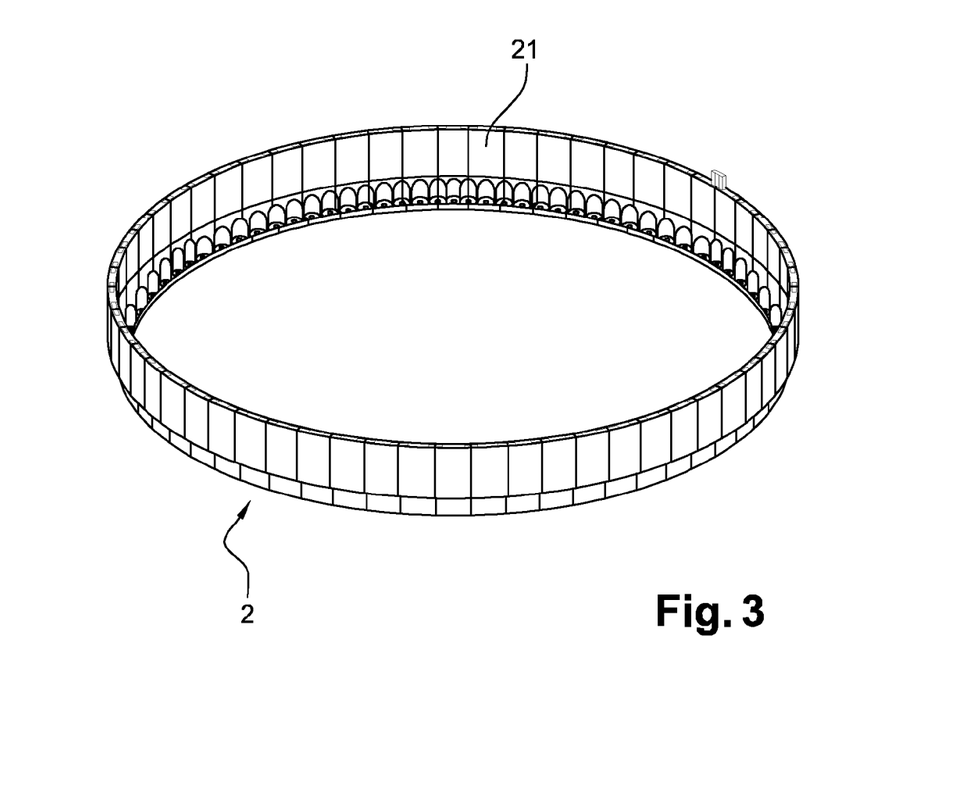
FIG. 3: a perspective view of the structure of the stator of a motor according to the invention.

The structure of the stator 2 is realized by a set of elements 21, at least three stator elements 21, such that during the differential thermal expansion with the baseplate 3, said stator elements come radially closer or further from one another in relation to the axis 9 in uniform manner, while maintaining a substantially circular shape of the stator crown, which are mechanically independent one from the other, i.e. without any mechanical linkage between them, juxtaposed and assembled onto the baseplate 3 so as to form the rotor crown, like the crown illustrated in FIG. 3.

It is understood that the wires of the stator coils 5 are not here considered to be mechanical linkages between the stator elements, since their function and structure do not, in practice, constitute a mechanical linkage with the stability and precision of a mechanical assembly.

Thus, an inner side of the stator 2 crown is opposite the magnets of the inner crown 6a of the rotor and an outer side of the stator 2 is opposite the magnets of the outer crown 6b of the rotor.

Each element 21 is made of a material that is preferably electrically non-conductive or with low conductivity, i.e. with electrical conductivity higher than $10\hat{0}5$ Ohms·m and, in addition, chosen from materials with high thermal conductivity, i.e., in this case, with thermal conductivity higher than or equal to 80 W/m·K.

The material of the elements 21 is, for example, a ceramic such as an alumina or an aluminum and boron nitride, which has the advantage of having all of these characteristics and whose thermal conductivity is of the order of 80 W/m·K.

In particular, if the motor's operating requirements include significant heat removal, the ceramic is e.g. an aluminum nitride whose thermal conductivity is higher than 150 W/m·K, of the order of 180 W/m·K.

Choosing a material with these characteristic makes it possible firstly to prevent energy losses in the stator and increases in the motor's operating temperature due to Foucault currents that would be induced in an electrically conductive material, and secondly to remove by conduction the heat generated by Joule effect in the stator coils 5 towards the baseplate 3, which acts, together with the surrounding structure, as a heat well; this heat is then removed, for example, by radiation of by a cooling circuit.

The number of elements 21 that form the crown of the stator 2, at least three but able to reach several hundred depending on the dimensions of the motor, is determined such that the operating motor's maximum differential expansion between the baseplate 3 and the elements 21 due to the effects of the temperature changes to which the motor may be subjected while in operation, introduce no appreciable deformation of the assembly constituted by the baseplate 3 and the stator 2 and does not generate any risk of damaging a stator element 21 or the baseplate.

This minimum of three stator elements 21 makes it possible to limit the torque variations by supplying a three phase current to the motor; it also provides a substantially uniform variation in every radial direction of the motor when the baseplate is subjected to size variations due to the motor's variations in operating temperature.

In practice, this constraint introduces a maximum allowable size for the elements 21 of a motor.

The elements 21 making up the structure of the stator are advantageously geometrically similar, at least for a section along a radial cross-section of the motor, to form a crown such as the crown illustrated in FIG. 3.

Advantageously, if no specific local function is to be assigned to one or more specific stator elements, all said elements are identical, as in the example shown in FIG. 3, at least in order to simplify the industrial manufacturing process.

Figure 4A:
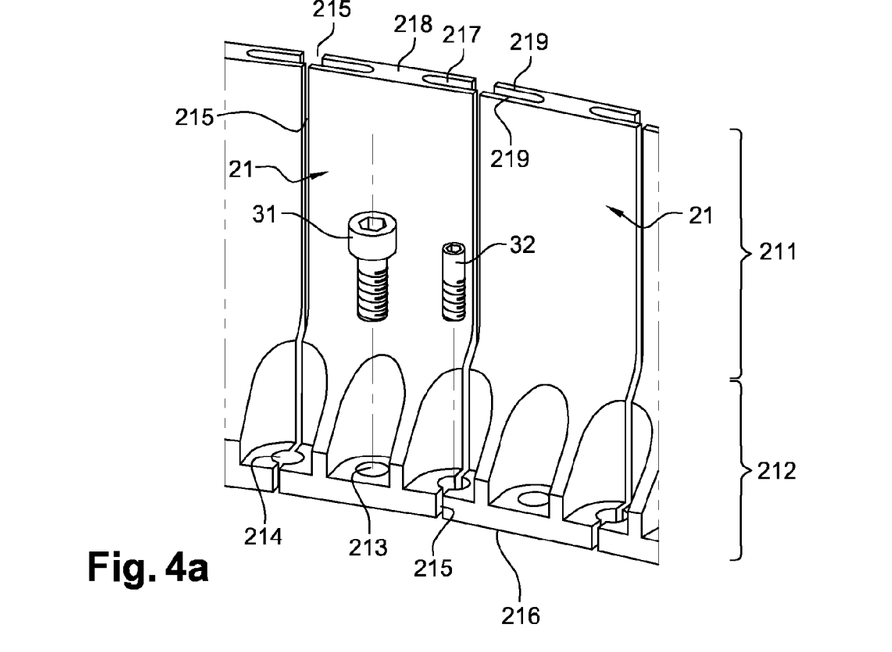
FIGS. 4a and 4b: perspective views with details of a portion of the stator in FIG. 3, seen from inside the stator, FIG. 4a and from outside, FIG. 4b.
Figure 4B:
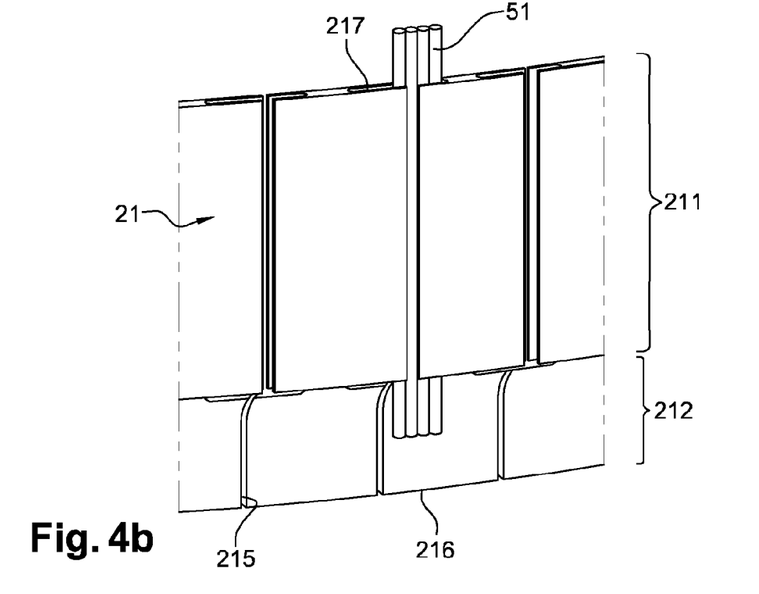

As illustrated in FIGS. 4a and 4b, a stator element 21 comprises a winding area 211 on the side of a first extremity, called "free extremity", of the stator element and a foot 212, located at an extremity of the stator element 21 opposite the free extremity, with which said element is fastened to the baseplate 3.

The foot 212 comprises a hole 213, through which passes a fastening element 31, such as a screw or an adjusted axle, which ensures that the rotor element 21 has a precise position on the baseplate 3.

Each stator element 21 comprises one and only one fastening element 31, such that the stator element is only maintained on the baseplate 3 by this single fastening element.

This characteristic of the motor introduces a constraint as to the dimensions of the stator elements 21, insofar as a stator element must be perfectly fastened by a single fastening element in the presence of the various forces (inertia, rotor reaction, etc.) that bear on said stator element; this limits its maximum dimensions, which are also already limited as explained previously, and requires a minimum of three stator elements; it also limits its minimum dimensions so that the required fastening elements can be fitted.

The foot 212 of a stator element 21 also comprises, preferably but not necessarily, in addition to the single fastening element 31, at least one opening 214 that works with an anti-rotation element 32, e.g. a screw or a pin, to prevent the stator element 21 from rotating about an axis of the fastener element 31 that goes through the hole 213.

The anti-rotation element 32 is used in particular during the assembly operations of the stator 2 and is removed when the stator is assembled, or is left in place. In this last case, the opening 214 and the anti-rotation element 32 have some clearance between them, along a pin/fastener direction, sufficient to allow the differential thermal expansion between the baseplate 3, on which the fixation and anti-rotation elements are attached and the stator element 21.

In the example of realization illustrated in FIG. 4a, each stator element 21 comprises two openings 214 arranged such that the anti-rotation element utilized for one opening is also utilized for the stator element immediately adjacent to it. In addition, the dimensions of the stator elements 21 along a perimeter of the stator 2 crown are determined such that, with the stator assembled on the baseplate 3, a gap 215 is maintained, irrespective of the acceptable internal temperature of the motor and taking into account the levels of vibrations and shocks to which the motor may be subjected while in operation, at a positive or zero value between two neighboring stator elements, in spite of the different expansion between the stator elements and the baseplate, e.g. made of aluminum alloy.

In the case illustrated in FIG. 4a, the opening 214 of a stator elements 21 forms, with the opening of the immediately neighboring stator, a hole with two half-portions, separated by the gap 215 between said stator elements such that, when the temperature conditions are such that the gap 215 becomes zero, the hole corresponds to a hole adapted to at least the diameter of the anti-rotation element used.

In a preferred form of realization, such as the form illustrated in FIG. 4a, the foot 212 is enlarged along the radial direction of the stator 2 so as to improve the mechanical strength of the link between the stator elements 21 and the baseplate 3 and so as to have an increased contact surface at a mounting plate 216, compared with a surface of a cross-section of the winding area 211, with the baseplate 3 favoring the heat exchanges between the stator 2 and said support structure and therefore favoring the removal of the energy dissipated in the form of heat by Joule effect in the stator windings and the elements.

Figure 4C:
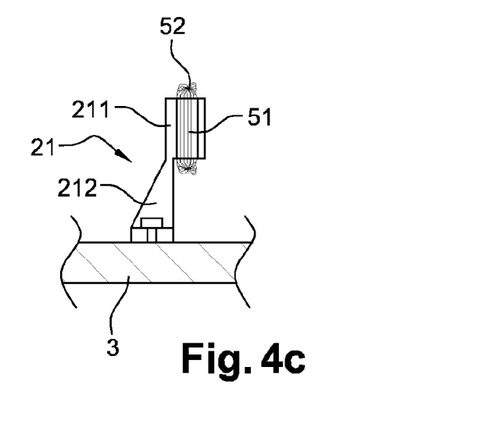
FIGS. 4c and 4d: a side view of examples of elements making up a stator.

The winding area 211 of a stator element 21 comprises a recess 217 in its radial thickness, in which the electrically conductive wires 51 of the stator windings 5 are arranged, particularly visible in the illustrations of FIGS. 4a and 4b, as well as in the details of FIG. 4c.

The recess 217 surrounds a core 218 of the windings area 211 on which core, the wires of the windings rest.

Figure 4D:
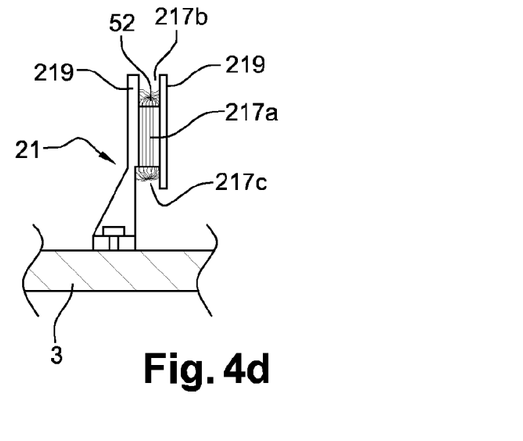

In a preferred embodiment, as illustrated in FIG. 4d, the recess 217 advantageously has different widths, along the radial direction of the stator, depending on the position of the windings area 211 around the core 218 to take into account the number of electrically conductive wires that are placed in said recess.

Possible segments of the upper recess 217b on the side of a free extremity of the windings area 211, and of the lower recess 217c on the side of the foot 212 of the stator element 21, of the recess 217 are preferably enlarged in relation to median recess segments 217a, in the vicinity of the windings area adjacent to the immediately neighboring stator elements, to be able to contain the increased number of electrically conductive wires in the buns' areas of the winding 5 coils 52.

Figure 5:
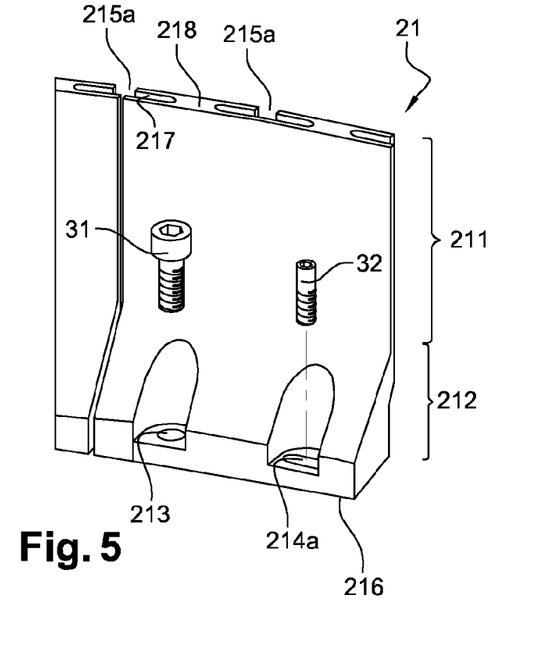
FIG. 5: a perspective view of a stator element comprising two winding cores.

Advantageously, on at least one of the sides of the windings area 211, the dimension along a perimeter of said windings area is reduced so as to maintain a gap 215a with the edge adjacent to the winding area of the immediately neighboring petal, which is at least equal to and preferably greater than the diameter of the wires of the coils, as can be seen in FIGS. 2b and 5. This free space allows the wires to be placed in the recess 217 to go through during the production of the stator coils.

In the example of realization illustrated in FIG. 2b or FIG. 4d, the portions of the windings area 211 that border the recess 217 form webs, i.e., flanges 219 that make up the edges of a groove around the core 218, which retain mechanically the wires 51 of the stator windings and which form thermal protection screens that limit the transmission of heat by radiation from the stator windings 5 towards the rotor magnets 6, which are in practice a small distance away, typically one millimeter for a motor of a few tens of centimeters in diameter.

The webs 219, i.e., flanges, which are integral parts of the stator elements 21, by increasing the contact surface between the wires 51 of the windings and the high thermal conductor material of the stator element 21, which contact can be improved by using a thermal conduction paste without metal loading, also encourages the removal by conduction of the heat produced by Joule effect in the wires 51 of the windings 5.

As illustrated in the various figures, the windings area 211 is advantageously offset along the diameter of the stator 2 in relation to the mounting plate 216; this improves the conditions in which the stator coils are manufactured as well as the installation conditions of the fastener elements 31 and of the stator 2 on the baseplate 3.

The example of realization described in detail and illustrated by diagrams 2 to 4 is non-limiting for the invention, which may take many forms of realization depending, in particular, on the number of windings of the motor and the number of phases of the electrical supply; these choices are made by a designer of the motor depending on the application it is aimed at.

Depending on the dimensions of the motor made and on the differential thermal expansions when the motor is in operation, a stator support element 21 comprises, as in the example described in detail, recesses 217 around a single core 218 or comprises recesses around two or more cores, as in the example of FIG. 5, which shows a stator support element 21 comprising two cores 218. When each stator element 21 comprises a single winding area 211, the number of stator elements making up the structure of the stator 2 corresponds to the number of steps of the motor when the motor is implemented as a stepping motor.

For a motor of average dimensions, a few tens of centimeters in diameter, this configuration, in which each stator element comprises a single winding area and corresponds to a number of stator elements and to dimensions of said stator element that satisfy the constraints previously exposed, may comprise several tens or even hundreds of stator elements; the stator structure shown in FIG. 3 illustrates this general principle.

Fastening the stator support elements 21 onto the baseplate 3 can be realized with any type of principle that does not introduce mechanical stresses in the assembled elements during the differential thermal expansion of the elements between one another, e.g. stator support elements 21 made of ceramic on a baseplate 3 made of aluminum.

In FIG. 5, a stator support element 21 is fastened by a fastener 31 that ensures precise positioning in the vicinity of an adjusted hole 213 and an anti-rotation element 32, which may be left in place or removed after the stator has been assembled according to the case, which maintains said stator element without blocking it in the direction defined by the two elements at an elongated hole 214a in said direction (elongation exaggerated in relation to the requirement in the drawing in FIG. 5, for the sake of clarity of the illustration).

Figure 6A:
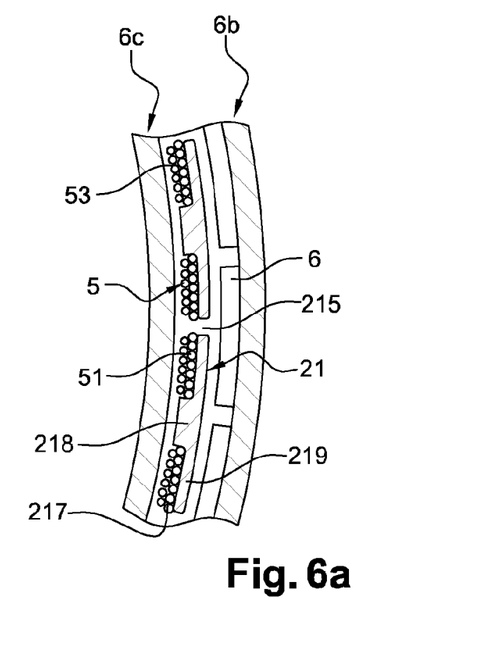
FIG. 6a: a partial cross-section of the rotor/stator assembly, developed in an embodiment with a rotor with a single set of permanent magnets.

The motor's rotor 4 can also comprise permanent magnets on only one crown, e.g. the outer crown 6b as illustrated in the cross-section in FIG. 6a; the other crown is made of soft iron, in the example the inner crown 6c.

Figure 6B:
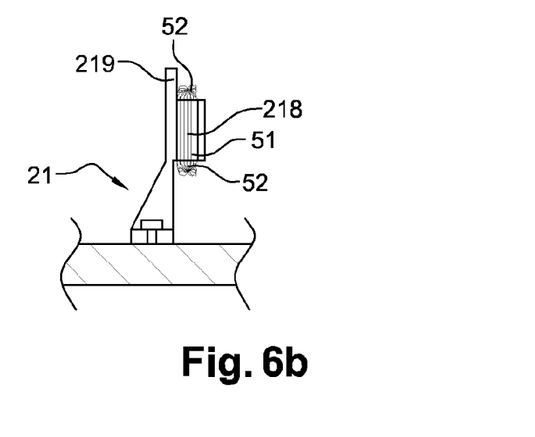

In this case, as shown in FIGS. 6a and 6b, the recesses 217 and webs 219, i.e., flanges of the windings areas 211 can be arranged such that said webs form a radiative screen against the heat radiation of the windings 5, only on the side towards which the permanent magnets 6 of the rotor are located.

Where applicable, the wires 51 of the windings are advantageously maintained on the windings area by means of an adhesive such as a resin 53.

In an advantageous embodiment, the surfaces of the permanent magnets 6 oriented towards the stator windings 5 are also fitted with a radiative screen, e.g. a reflective coating such as reflective paint, that reflects the heat radiation emitted by the stator.

A motor consistent with the invention by suitably choosing the materials and the dimensions of the various elements, in particular to limit the generation of heat by Joule effect and by adequate contact surfaces between the stator elements and the baseplate to ensure the flow of heat to be transferred, when the baseplate is fastened on a structure able to absorb or drain the heat produced by the motor when in operation, has an internal temperature, in particular around the permanent magnets, which is advantageously maintained to less than 380 Kelvin without utilizing any active cooling of the motor.

All the principles of the electric motor such as they have been described can also be transposed to the case of a linear electric motor.

In the case of a linear electric motor with permanent magnets, the magnets are aligned along at least one row and fastened to a moving structure, which is guided linearly instead of in rotation, but which can be equated with the rotor of the rotating electric motor.

The invention allows a high-performance electric motor with permanent magnets to be realized, which delivers high torque by using highly magnetized magnets, without using an active cooling system at their maximum utilization temperature, above which temperature, the loss of magnetism in the magnets is harmful to the motor's efficient operation.

The invention claimed is:

1. An electric motor (1) with permanent magnets comprising: a rotor (4), on which permanent magnets (6) are fastened; and
a stator (2), said stator comprising a stator structure and coils (5) arranged onto said stator structure, wherein the stator structure is resulted in an assembly of at least three juxtaposed stator elements (21) fastened only to a baseplate (3), and wherein each stator element (21):
comprises at least one winding area (211) on a side of a first end of said stator element and a fastening foot (212) on a side of a second end of the stator element, opposite to the first end, the stator element being fastened only to the baseplate (3) at the second end;
is fastened only to the baseplate (3) with a bearing surface (216) of the fastening foot (212) tight on said baseplate by means of a single fastening element (31) adjusted to a bore (213) crossing said fastening foot; and
wherein the bearing surface (216) enlarged in relation to a cross-section of the stator element in the winding area (211).

2. The electric motor according to claim 1, wherein each stator element (21) comprises at least one opening (214), said opening working with at least one anti-rotation element (32) to prevent the stator element (21) from rotating about the single fastening element (31) while having a clearance with said anti-rotation element to allow a differential thermal expansion, in operation of the electric motor, between said stator element and the baseplate (3).

3. The electric motor according to claim 1, wherein the stator elements (21) fastened only on the baseplate (3) have a positive gap between neighboring stator elements, while in operation.

4. The electric motor according to claim 1, wherein the winding area (211) of a stator element (21) comprises a recess (217) around a core (218), in which wires (51) of the stator windings (5) are maintained.

5. The electric motor according to claim 4, wherein the recess (217) of the winding area (211) comprises a top segment (217b), on a side of the first end of the stator element, and a bottom segment (217c), on a side of the second end of the stator element, is enlarged compared to lateral segments (217a) of said winding area, between said top segment and said bottom segment.

6. The electric motor according to claim 1, wherein at least one flange (219) of the stator element (21) borders a winding area (211), said flange forming an anti-radiative heat screen between the coils (5) of said winding area and a crown of magnets (6a, 6b) of the rotor.

7. The electric motor according to claim 4, wherein the recess (217) of a winding area (211) is delimited by flanges (219) forming a groove, over at least one segment of said winding area, said flanges being located on either side of the coils (5).

8. The electric motor according to claim 1, wherein, a width of a space (215, 215a) between two adjacent stator elements, at least on an inner side of the stator or on an outer side of the stator, is at least equal to a diameter of wires (51) of the coils (5) installed on the stator (2) structure.

9. The electric motor according to claim 1, wherein the stator elements (21) are made with a non-magnetic and electrically non-conducing or low-conductivity ceramic material chosen from ceramic materials with a thermal conduction higher than or equal to 80 W/m·K.

10. The electric motor according to claim 9, wherein the ceramic material of the stator elements (21) is an aluminum and boron nitride.

11. The electric motor according to claim 9, wherein the ceramic material of the stator elements (21) is an aluminum nitride with thermal conduction greater than 150 W/m·K.

12. The electric motor according to claim 1, wherein each stator element (21) comprises a single winding area (211).

13. The electric motor according to claim 1, wherein the stator elements (21) have a similar or identical shape.

14. The electric motor according to claim 1, wherein the permanent magnets (6) of the rotor (4) are neodymium magnets.

15. The electric motor according to claim 1, wherein the rotor (4) comprises two crowns (6a, 6b) wearing each a row of permanent magnets and defining a space between the two crowns in which the stator (2) is located.

16. The electric motor according to claim 1, wherein the rotor (4) comprises one crown (6b) wearing a row of permanent magnets and one crown (6c) made of a soft iron web and defining a space between the two crowns in which space the stator (2) is located.

17. The electric motor according to claim 1, wherein one side of the permanent magnets opposite the stator is covered with a heat radiation reflective coating.

* * * * *